No. 857,449. PATENTED JUNE 18, 1907.
H. T. CURRIE.
CHAIN.
APPLICATION FILED DEC. 27, 1906.
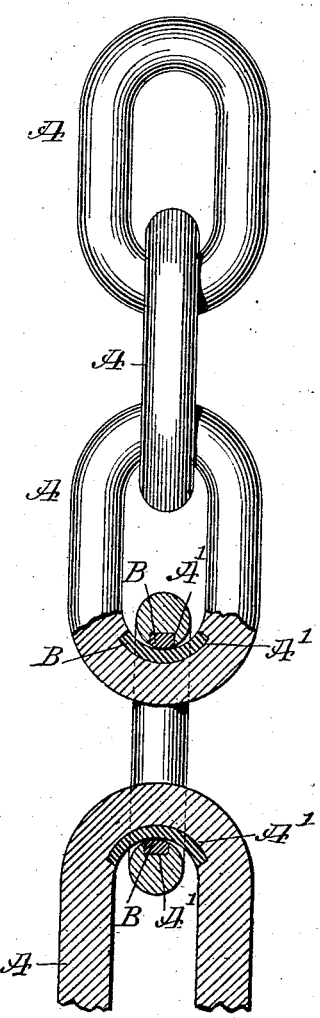
WITNESSES
INVENTOR
Horace T. Currie
BY
ATTORNEYS
THE NORRIS PETERS CO., WASHINGTON, D. C.

UNITED STATES PATENT OFFICE.

HORACE THOMPSON CURRIE, OF CHICAGO, ILLINOIS.

CHAIN.

No. 857,449.　　　Specification of Letters Patent.　　　Patented June 18, 1907.

Application filed December 27, 1906. Serial No. 349,661.

*To all whom it may concern:*

Be it known that I, HORACE THOMPSON CURRIE, a citizen of the United States, and a resident of Chicago, in the county of Cook and State of Illinois, have invented a new and Improved Chain, of which the following is a full, clear, and exact description.

The object of the invention is to provide a new and improved chain arranged to reduce the friction of the links to a minimum and to prolong the life of the chain.

The invention consists of novel features and parts and combinations of the same, which will be more fully described hereinafter and then pointed out in the claims.

A practical embodiment of the invention is represented in the accompanying drawing forming a part of this specification, in which the figure is a face view of the chain, parts being in section.

Each of the links A of an ordinary cable chain for use in steam shovels, dredgers and the like, is provided at the inner face of each end with a recess A' filled with a piece of anti-friction metal B such as Babbitt metal and the like, so that when the chain is in use the ends of the interlocked links contact at the corresponding pieces of anti-friction metal B, thus reducing the friction of the contacting and wearing surfaces of the links to a minimum and prolonging the life of the chain.

By reference to the drawing it will be noticed that the outer face of each piece of anti-friction metal B conforms to the contour of the inner surface of the corresponding end of the link, that is, each link has an outward appearance of an ordinary link. In case the piece of anti-friction metal in either end of a link is worn out, it can be readily removed and replaced by a new one. The anti-friction metal is preferably cast into the recess A', but a piece of such metal may be driven into the recess, and in either case no special fastening devices are required for holding the anti-friction metal in place. The anti-friction metal extends only at the portions of the links subjected to wear, and hence the side arms of the links are not affected or weakened in any manner.

Having thus described my invention, I claim as new and desire to secure by Letters Patent:

A chain having interlocked links each provided at the inner face of each end with a recess and an anti-friction metal filling the said recess, and conforming at its outer surface to the contour of the inner face of the end of the link.

In testimony whereof I have signed my name to this specification in the presence of two subscribing witnesses.

HORACE THOMPSON CURRIE.

Witnesses:
　J. B. MACLAREN,
　PHILIP KADEL.